United States Patent

Prasil

[11] Patent Number: 5,628,914
[45] Date of Patent: May 13, 1997

[54] METHOD FOR RECYCLING LITHOGRAPHIC INK

[76] Inventor: Frank Prasil, 3021 Old Maryville Pike, Knoxville, Tenn. 37920

[21] Appl. No.: 539,546

[22] Filed: Oct. 5, 1995

[51] Int. Cl.⁶ .................................................. B01D 17/032
[52] U.S. Cl. ........................... 210/770; 210/803; 210/804; 210/251
[58] Field of Search ........................... 106/20 R; 210/175, 210/179, 180, 187, 767, 770, 803, 804, 251

[56] References Cited

U.S. PATENT DOCUMENTS

| | | | |
|---|---|---|---|
| 4,391,638 | 7/1983 | Fusco et al. | 106/20 |
| 4,427,810 | 1/1984 | Chisvette et al. | 524/88 |
| 4,473,380 | 9/1984 | Voliva et al. | 55/8 |
| 4,778,604 | 10/1988 | Leonard et al. | 210/664 |

*Primary Examiner*—Frank Spear
*Attorney, Agent, or Firm*—Reneé Michelle Larson

[57] ABSTRACT

A closed system for reclaiming ink, solvent, and water from waste lithographic ink, or other ink types, without generating hazardous by-products is disclosed. The recycling process is performed under vacuum conditions on standard equipment, such as an agitation station, an evaporator chamber, a grinder, a condensation tank, and a vapor exhaust recovery condenser, readily available in the ink industry. Waste ink containing ink solids, solvent, water, and possibly foreign material such as debris, lint, paper, and dust, is first mixed to create a homogeneous slurry mixture of the ink, solvent, water and foreign materials. Next, water and solvent is evaporated from the slurry mixture and collected so that it may condensate and then settle. The slurry mixture is ground and heated up in order to evaporate any remaining water and solvent from the slurry. The grinding step grinds the ink and any foreign material to create an ink emulsion characterized as having particles smaller than or equal to the size of the original virgin ink from which the waste ink is derived. The evaporation step may be performed either before and during the grinding step, or only during the grinding step.

37 Claims, 2 Drawing Sheets

METHOD FOR RECYCLING LITHOGRAPHIC INK

BACKGROUND OF THE INVENTION

The present invention relates generally to recycling technology, and more specifically to a technology for recycling lithographic printers' waste ink.

U.S. Government figures estimate that there are approximately 44,000 sheet fed lithographic off-set printers nationwide. These lithographic print operations generate slightly more than 100,000 barrels, or more than 60 million lb., of hazardous waste ink annually as a by-product of the printing process. Lithographic ink as well as waste ink, commonly referred to as "sludge" in the industry, has four basic components: oil derived from petrochemical and/or agricultural substrates, pigments derived from petrochemical and/or metal oxides or mineral oxides, solvent derived from petrochemical sources, and aqueous base fluids such as water. Thus, a generic formulation for lithographic sheet fed offset ink might include the following materials: linseed oil, chinawood oil, alkyd resin, rosin ester, phenolic modified rosin ester, hydrocarbon resin, cobalt drier, manganese drier, polyethylene wax, high boiling petroleum distillate, and pigment. Additionally, waste ink which has been exposed to enamel coated paper may contain clay.

Various factors make the recycling of waste ink a more attractive alternative than the disposal of waste ink. Waste ink from lithographic printing has long been considered a hazardous material. As a hazardous material, waste ink from lithographic print operations must meet various federal and state regulations which make the proper disposal of hazardous waste ink an extremely expensive and paper intensive task. For instance, recent environmental concerns and the Clean Air Act have prompted many areas of the country to prohibit the burning of waste ink altogether. Likewise, concern over landfill space has made it more expensive to dispose of hazardous waste ink. To properly dispose of waste ink is an expensive proposition which may range in price from approximately $165/barrel to more than $600/barrel. For these reasons, the recycling of ink is becoming more important to the print industry as a cost effective, environmentally sound business decision.

In recognition of the importance of waste ink recycling, there are currently available various ink recycling methods. Standard reclamation efforts have commonly been limited to (a) rejuvenation of stored lithographic inks which quickly become "stale" after a relatively short shelf life, (b) distillation of waste ink, a method which boils off water and solvent and subsequently filters out ink pigment chemicals, many of which are ultimately disposed of as waste, and (c) centrifuging, a process which separates usable ink from solids which are disposed of as waste.

Rejuvenating "stale" ink is accomplished using rolls, such as pinch, nip, or squeegee rolls, to restore the ink to its initial viscosity thereby eliminating ink coagulations. Once ink is rejuvenated, it is suitable for most normal printing operations. Ink contaminated with solvent, dust, paper, and machine wash-down fluids, however, is not recoverable using the nip roll process. An example of recycling through distillation is shown in U.S. Pat. No. 4,778,604 issued Oct. 18, 1988 to Leonard et al, hereinafter the '604 patent. The '604 patent describes a method for reclaiming waste ink whereby solid impurities are removed during a filtration step. An example of recycling through centrifuging may be found in U.S. Pat. No. 4,391,638 issued Jul. 5, 1983 to Fusco et al, hereinafter the '638 patent. In the recycling process of the Fusco et al. patent, the waste ink is diluted and a centrifugal operation facilitates separation of waste from ink to form a waste cake. Only a small portion of lithographic waste ink, approximately 5%, is actually recovered through these processes. Thus, approximately 60,000,000 lb. of hazardous waste ink must be disposed of.

Currently available method of waste ink recycling represent important advances but there are still unmet needs in the ink recycling industry. All prior ink recycling methods are incapable of recycling 100% of waste ink because hazardous by-products are generated by the waste ink recycling process which must be stored, burned, or otherwise disposed of; thus, current methods for recycling waste ink are very inefficient. For example, the solid impurities and "dirty water" collected and removed from waste ink in the '604 patent which must be disposed of represent a hazard to the environment. Thus, while the '604 patent does progress the art of waste ink recycling, there is still an unmet need in the art to be able to recycle waste ink without releasing dirty water, solid waste, or other impurities into the environment. Likewise, the '638 patent produces a waste cake as a by-product of the centrifugal recycling operation which also represents a hazard to the environment.

There is also an unmet need in the art to be able to recycle colored ink as well as black ink. Current recycling techniques are directed to recycling black ink. For instance, the '604 patent is directed to recycling black ink only, reciting a pigment content of only approximately 14%. It is a limitation that only black ink is recycled in the '604 patent. Today's printers regularly use color inks which must be recycled or disposed of.

SUMMARY OF THE INVENTION

It is an object of the present invention to have an ink recycling process which does not generate hazardous waste as a by-product or final product of the recycling process.

It is further an object of the present invention to have an ink recycling process which is capable of recycling both color and black ink.

It is still further an object of the present invention to be able to perform an ink recycling process on standard industry equipment making only slight modifications to such standard industry equipment.

Therefore, according to the present invention, a closed system for reclaiming ink, solvent, and water from waste lithographic ink, or other ink types, without generating hazardous by-products is disclosed. The recycling process is performed under vacuum conditions on standard equipment, such as an agitation station, an evaporator chamber, a grinder, a condensation tank, and a vapor exhaust recovery condenser, readily available in the ink industry. According to a first preferred embodiment, waste ink containing ink solids, solvent, water, and possibly solid impurities or foreign material such as debris, lint, paper, and dust, is first mixed in an agitation station to create a homogeneous slurry mixture of the ink, solvent, water and foreign materials. The slurry mixture is then fed to an evaporator chamber where most of the solvent and water is evaporated and subsequently collected in a condensation tank. The remaining slurry mixture is directed to a grinder which grinds the ink solids as well as any foreign material to a very small size. The foreign material is ground to a small enough size to be incorporated into the ink. Grinding generates heat which evaporates any remaining water and solvent from the slurry mixture, leaving only a finely ground ink emulsion. As before, evaporated water and solvent is collected in the condensation tank.

According to a second preferred embodiment, the evaporator chamber is bypassed. The slurry mixture is fed directly to the grinder after being mixed, and evaporation of water and solvent from the slurry mixture is accomplished by the heat generated from grinding. As a grinder may typically evaporate water and solvent more slowly than the evaporator chamber, the mixing performed by the agitation station may be proceeded by decanting, or pouring off, most of the water and a substantial portion of the solvent from the top of incoming barrels of waste ink. Any water and solvent poured off is collected in the condensation tank where, after cooling, the liquids will settle according to their relative densities. Ink particles contained in the water may be removed from the water by electrostatic charging if so desired.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE INVENTION

The present invention provides a method for recycling and thus reclaiming waste ink in a closed loop system such that there are no hazardous by-products or end-products generated by the recycling process. The method of the present invention recycles waste ink in such a manner that ink as well as any foreign materials or solid impurities in the ink like paper, lint, debris, water, and dust are finely ground and incorporated into the ink. Previously, such foreign materials were separated from the ink as hazardous by-products of the ink recycling process which had to be disposed of through waste treatment, such as incineration which releases hazardous chemicals like Carbon Dioxide into the atmosphere, or some other approved disposition method for hazardous waste.

Waste lithographic ink is recycled through a series of processing steps under vacuum conditions in a closed system such that no solid, fluid, or gaseous emission is discharged to the environment. Principal process steps include: mixing, vaporization, grinding, and condensation. Three distinct and marketable products are reclaimed from the waste ink: an ink emulsion, a solvent fluid, and water suitable for use in the printing process. The reclaimed solvent and water meet printing standards.

Figure 1:
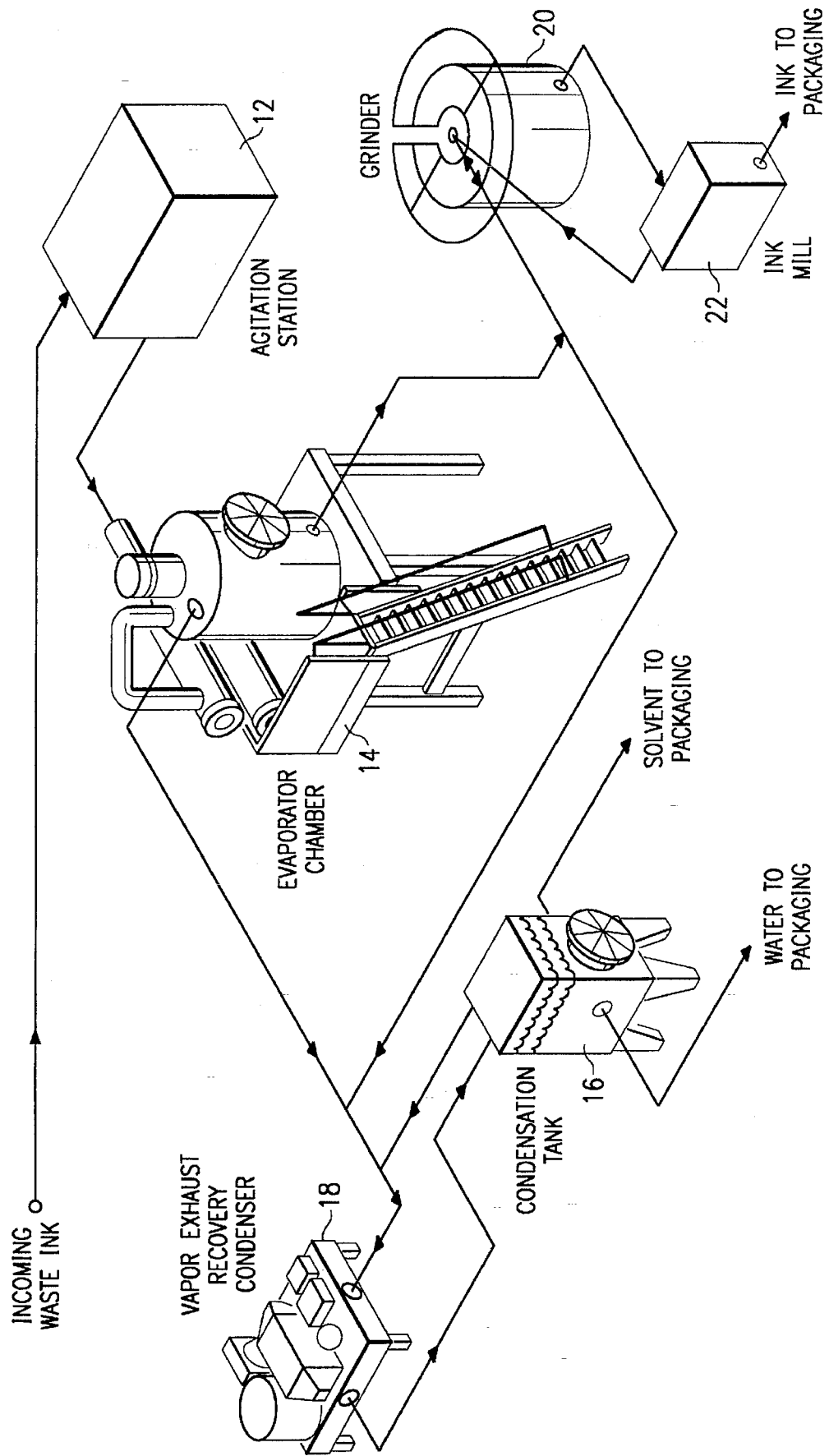
FIG. 1 is a process flow diagram of the preferred steps for recycling waste ink, according to a first preferred embodiment of the present invention.

Referring to FIG. 1, a process flow diagram of the preferred steps for recycling lithographic ink, according to a first preferred embodiment of the invention, is shown. The recycling equipment of FIG. 1 is interconnected under vacuum containment. Various steps in the waste ink recycling process, including waste material collection, agitation, vaporization, grinding, settling, separation, and finally packaging, are performed by the equipment. The equipment of FIG. 1 is standard equipment readily found in the industry which is slightly modified to ensure vacuum containment; for instance, seals are added to ensure a vacuum condition and grinder 20 has been modified to have a cover to prevent vapors from escaping into the air. The arrows of FIG. 1 indicate the process flow of the recycling method of the present invention.

Incoming waste ink to be recycled is typically salvaged from print shop operations and may contain all manner of ink and ink contaminates such as chemicals, debris, paper, lint, and dust. For instance, while virgin ink is approximately 75% ink solids (ink pigments and oil solution) and 25% solvent by volume, the composition of waste ink before it is salvaged may be only approximately 50% ink solids, 25% solvent, and 25% aqueous solution, such as water, and contaminants by volume. These compositions of virgin ink and waste ink, respectively, are but an example; the exact composition by volume of waste ink may vary widely in practice.

The waste ink is fed to agitation station 12. Agitation station 12 agitates the waste ink into a completely homogeneous slurry containing ink solids, solvent, water, and foreign materials. According to a first preferred embodiment of the present invention, the slurry is then fed to evaporator chamber 14 where the homogeneous slurry mixture continues to be agitated. The continuing agitation causes heat to be generated. The process settings of temperature, pressure and agitation produced by evaporator chamber 14 are variable conditions which are closely controlled as a function of the specific chemical formulation of the slurry. These process settings are controlled such that enough heat and pressure are generated to evaporate a substantial portion of the water and solvent content of the slurry without evaporating the waste ink's oil base which would degrade the integrity of the ink. In other words, the temperature of the slurry is raised to the vapor point of water under vacuum conditions while mixing the waste ink but the temperature of the slurry is kept below the boiling point of ink, approximately 340° Fahrenheit. The solvent evaporates first, followed by the evaporation of the water.

The solvent and water evaporated from the slurry travel to condensation tank 16 where they will cool and condense. As the water and solvent vapors become liquid, they settle and separate according to each liquid's inherent relative density (specific gravity). Thus, the solvent liquid will settle to the top portion of the condensation tank 16 while the water will settle to the bottom portion of the condensation tank 16. Once the liquids have thus settled, they may each be separated in preparation for packaging. The solvent liquid is pulled from the top portion of the condensation tank 16, while the water is retrieved from the bottom portion of condensation tank 16. The solvent and water are next tested to ensure that their content complies with regulations. Each liquid is then routed to its respective packaging station where it will be packaged according to respective industrial printing uses. Vapor which exists, or forms in conveyance to or from the condensation tank, is collected by vapor exhaust recovery condenser 18 and is then fed back to condensation tank 16.

Following evaporation of a substantial portion of water and solvent, the slurry, consisting of the ink solids, foreign material, and the remaining water and solvent, is introduced to grinder 20. Grinder 20 may be a ball mill grinder of the "stirred ball mill" type. A stirred ball mill grinder has internally agitating media such as rotating cylinders, steel bars, or steel balls similar to those of a mix master. A stirred ball mill grinder is able to grind material more quickly and more finely than is a typical ball mill grinder. Grinder 20 proceeds to grind the slurry to a size that is equivalent to or smaller than the size of standard virgin ink particles. Thus, grinder 20 pulverizes any ink chips, paper fragments, lint, paper and any other solid impurities and foreign material in the ink, incorporating foreign materials into the ink. Ink chips are often found in lithographic ink, because spent lithographic ink forms a skin that chips when disturbed. This skin may be caused by drying agents which have been added to the ink. Grinder 20 completes its grinding cycle within a given time frame which is determined by the composition and volume of the slurry.

Grinding the slurry not only pulverizes the foreign material to an acceptably small size, i.e. less than or equal to the size of the ink particles, it generates friction in a vacuum which raises the temperature of the slurry to the vapor stage, approximately 180° Fahrenheit, thereby evaporating any remaining water and solvent from the slurry. This is different from previous recycling methods in which heat was directly applied to waste ink as a separate step rather than as a result of grinding the ink. For instance, U.S. Pat. No. 4,778,604 issued Oct. 18, 1988 to Leonard et al. heats the ink in a separate step and does not grind the ink.

Careful control of temperature and pressure process parameters prevent vaporization, or degradation, of the ink; the temperature is carefully monitored to insure that the temperature inside grinder 20 never gets hot enough to evaporate the ink itself. The solvent evaporates first, followed by the evaporation of the water. The evaporated water and solvent are recovered by vapor exhaust recovery condenser 18 before being sent to condensation tank 16 where they will condense and then separate according to their relative densities. Since this is a closed loop process, no vapors will escape and thus no pollution is discharged to the atmosphere.

From grinder 20, the ink emulsion goes to an ink mill 22 for further processing. Ink mill 22 is comprised of a series of rollers which takes bubbles out of the ink. Thus, ink mill 22 removes entrapped air and produces an ink emulsion having a uniform texture and a uniform density suitable for packaging. Any solid impurities such as dirt not fully integrated into the ink emulsion are separated from the ink emulsion by ink mill 22 and routed back to grinder 20 for more grinding. The ink emulsion is then tested for compliance with recycling regulations before being sent to an ink packaging station.

The step of grinding is preferred over other methods, such as boiling, which may be used to evaporate the remaining water and solvent present in the slurry but which do not reduce foreign material to an acceptably small size. While boiling raises the temperature of the slurry and thus directly leads to the evaporation of water and solvent, boiling is incapable of reducing the size of foreign materials so that they may be incorporated into the ink.

Figure 2:
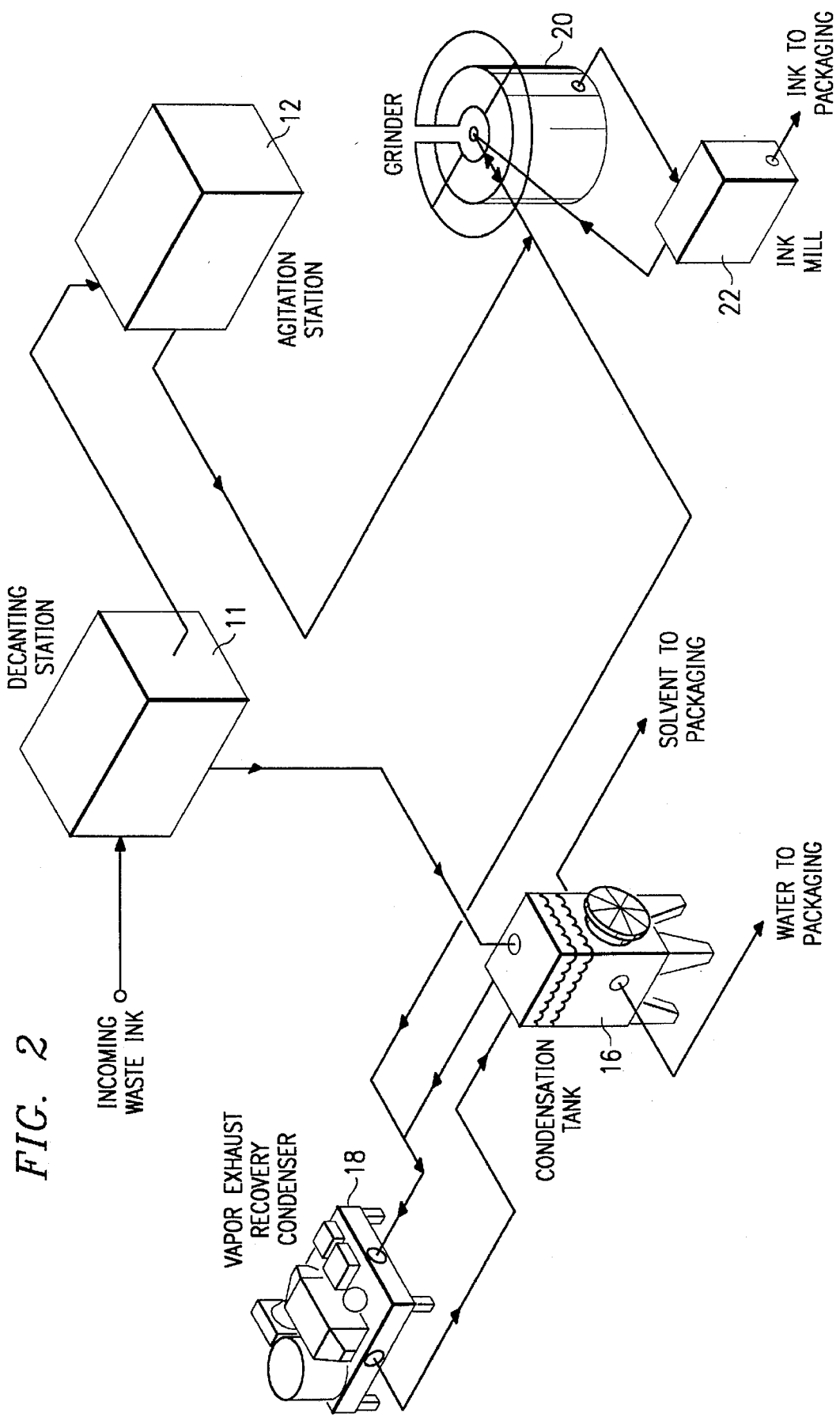
FIG. 2 is a process flow diagram of the preferred steps for recycling waste ink, according to a second preferred embodiment of the present invention

According to a second preferred embodiment of the present invention, shown in FIG. 2, it is possible to bypass evaporator chamber 14 and send the slurry from agitator station 12 directly to grinder 20 because grinder 20 is also capable of evaporating off water and solvent as heretofore described. Since grinder 20 will typically evaporate water and solvent more slowly than evaporator chamber 14, it is permissible to decant, or pour off, most of the water and a portion of the solvent (the solvent evaporates more quickly than water) prior to forming the slurry in agitation station 12. Decanting most of the water and a portion of the solvent from the slurry allows grinder 20 to more quickly evaporate any remaining water and solvent and thus to more quickly produce the ink emulsion. Water that Has been decanted may contain particles of ink. These ink particles may be removed from the water by an electrostatic charging method or device. Water and solvent which have been decanted are collected by the condensation tank where they will settle out according to their respective relative densities. Thus, even when decanting water and solvent at the beginning of the recycling process, nothing is released to the environment in the closed system of the present invention.

A unique process which allows the recovery of spent lithographic ink and ink by-products such as water and solvent has been described. All ink, solvent, and water present in waste ink produced by lithographic print operations are reclaimed. Additionally, the recycling process of the present invention recycles foreign material which may have been introduced to the ink during printing. Such foreign material is ground and becomes an essential and valuable ingredient of the renewed ink product. The present invention may be used to recycle both black and colored ink, as well as other ink types such as metallic ink. Color ink having a pigment content of approximately 20% or more (black ink has a pigment content of only approximately 14%) is well suited to the present invention.

The present invention provides several important environmental, quality, and cost benefits to the ink recycler. The recycling method described herein is a closed system, meaning that the only products generated by the recycling process are reclaimed ink, solvent, and water. There are no hazardous waste by-products or end-products generated at any time during the recycling process, nor does the recycling process of the present invention require additional material other than the waste ink to generate the reclaimed products. Such a closed system represents a significant improvement over the prior art ink recycling methods which generate hazardous waste both during and at the end of the recycling process. Thus the process of the present invention does not emit any matter or material, in gaseous, liquid, or solid form, to the environment at any time during or after the recycling process. Air pollution does not occur; this is a significant improvement when one considers that prior art methods typically require 12 lb. of air to incinerate and discharge 1 lb. of ink sludge into the atmosphere. The only output of the recycling process is high quality reclaimed ink, reclaimed solvent, and reclaimed water.

The present invention also provides significant energy and cost savings over prior art methods of ink disposal. The process produces renewed ink and renewed ink by-products with only a fraction of the energy required to produce virgin ink products from raw material sources. As an example, assume that a recycling site using the present invention works for 300 days per year and is able to recycle 264,000 gallons of waste ink sludge. The amount of energy required to recycle this much ink is approximately 0.216 billion Btu whereas the amount of energy required to produce 264,000 gallons of virgin ink is typically 13.7 billion Btu; the present invention thus offers substantial energy savings. Energy is often provided in the form of oil, a nonrenewable natural resource. Additionally, significant hazardous waste disposal costs are avoided altogether. Assuming a conservative estimate of $300/barrel to dispose of waste ink, hazardous waste disposal savings of $1,400,000 are realized in this example. Thus, the present invention not only conserves energy, it reduces the depletion of non-renewable natural resources. Finally, the reclaimed by-products of the waste ink may be sold to generate income. Not only may the ink itself be resold, but the reclaimed solvent and water are also of considerable value to the print industry. Solvent and water are used by printers to clean their printing presses.

In addition to environmental and cost advantages, the present invention also provides important quality improvements over the prior art. The grinding step of the recycling process yields a smoother textured ink than the virgin ink from which it is reclaimed, thereby extending the area of coverage per unit of fluid volume. This attribute is especially helpful when printing on recycled paper. Recycling paper shortens the fibers of the paper. Because of the shortness of the fibers, recycled paper tends to break up on the printing press and thus resembles blotter paper in that sense. The recycled ink penetrates the deeper recesses of recycled paper, leaving shorter surface fibers undisturbed. The recycled ink produced by the present invention is lower in tack and has other characteristics which allow the ink to be used on recycled paper without picking the fibers of the recycled paper off, thereby preventing a good deal of downtime for cleaning the blanket and restarting the press. This results in less paper fiber-to-machine contamination, reducing print machine downtime and clean-up waste.

The aforementioned quality improvements are obtained without mixing the reclaimed ink with virgin ink, a procedure that is commonly used in other recycling methods to improve the quality of the recycled ink. It is worth noting, however, that the reclaimed ink of the present invention may indeed be mixed with virgin ink if so desired. The reclaimed ink may also be combined with additives to effect a desired print characteristic. For instance, the reclaimed ink may be mixed with pigments in order to enhance the ink color. Like the reclaimed ink, such ink combinations may be used in standard ink printing operations.

Another major advantage made possible by the superior quality of the reclaimed ink is that it is ground fine enough to print continuous tone lithography. While normal lithographic printing prints approximately 300 dots per inch, continuous tone lithography prints approximately 1100 dots or more per inch. Continuous tone lithography is rarely performed because most lithographic ink particles are not small enough. However, the ink particles of the present invention are ground small enough to permit continuous tone lithography. While virgin ink particles are typically approximately 5 micron in size, the size of recycled ink particles may be considerably smaller. Not only is the ink initially ground during the printing process, it is again ground during the recycling process of the present invention.

Yet another advantage of the present invention is that the recycling process may be performed on standard equipment readily available in the industry with only slight modifications to the equipment. Thus the agitation station, evaporator chamber, grinder, condensation tank, and vapor exhaust recovery condenser are all standard equipment; no special equipment or process and machine set-up parameters are required to use the invention. Similarly, the reclaimed ink product of the present invention may be readily used on commercial printing equipment and, as described above, reclaimed ink itself, being richer in pigment than virgin ink, has a finer grain and superior coverage that is especially advantageous when used on recycled paper.

While the invention has been particularly shown and described with reference to a preferred embodiment, it will be understood by those skilled in the art that various changes in form and detail may be made therein without departing from the spirit and scope of the invention. For instance, while lithographic waste ink is discussed, it is understood that the recycling method of the present invention may be used to recycle any type of ink. Any ink having waste material such as dust, lint, paper, clay, water, etc. be recycled using the present invention.

What is claimed is:

1. A method of reclaiming waste ink contaminated with water, solvents, and solid impurities, comprising the steps of:
    mixing the waste ink to create a slurry mixture containing the waste ink, the water, the solvents, and the solid impurities; and
    grinding the slurry mixture under a vacuum to produce an ink emulsion such that the waste ink and the solid impurities are ground to a particle size that is less than or equal in size to a particle size of virgin ink from which the waste ink is derived, wherein the step of grinding the slurry mixture generates heat sufficient to evaporate the water and the solvents from the slurry mixture without evaporating the waste ink.

2. The method of claim 1, wherein the step of mixing the waste ink is performed in an agitation station.

3. The method of claim 1, wherein the slurry mixture is homogeneous.

4. The method of claim 1, wherein the step of grinding the slurry mixture is performed in a grinder.

5. The method of claim 4, wherein the grinder is a stirred ball mill grinder.

6. The method of claim 1, wherein the water and the solvents evaporated from the slurry mixture are collected in a condensation tank.

7. The method of claim 6, wherein the water and the solvents collected in the condensation tank cool and separate according to their respective relative densities.

8. The method of claim 7, wherein after the water and the solvents in the condensation tank cool and separate according to their respective relative densities, the water and the solvents are removed from the condensation tank, tested to ensure that the water and the solvents comply with recycling regulations, and then packaged.

9. The method of claim 1, wherein after the step of grinding the slurry mixture to produce an ink emulsion, the further step of:
    processing the ink emulsion to remove any entrapped air and to ensure a uniform texture and a uniform density of the ink emulsion.

10. The method of claim 9, wherein the step of processing the ink emulsion is performed by an ink mill.

11. The method of claim 1, wherein the waste ink and the virgin ink are lithographic ink.

12. The method of claim 1, wherein the ink emulsion is suitable for continuous tone lithography.

13. A method of reclaiming waste ink contaminated with water, solvents, and solid impurities, comprising the steps of:
    decanting a substantial portion of the water and a substantial portion of the solvents of the waste ink;
    mixing the waste ink to create a slurry mixture containing the waste ink, the water, the solvents, and the solid impurities; and
    grinding the slurry mixture under a vacuum to produce an ink emulsion such that the waste ink and the solid impurities are ground to a particle size that is less than or equal in size to a particle size of virgin ink from which the waste ink is derived, wherein the step of grinding the slurry mixture generates heat sufficient to evaporate any remaining water and solvents from the slurry mixture without evaporating the waste ink.

14. The method of claim 13, wherein the decanted water and the solvents, and the remaining water and solvents evaporated from the slurry mixture by the grinder are collected in a condensation tank.

15. The method of claim 14, wherein the water and the solvents collected in the condensation tank cool and separate according to their respective relative densities.

16. The method of claim 15, wherein after the water and the solvents in the condensation tank cool and separate according to their respective relative densities, the water and the solvents are removed from the condensation tank, tested to ensure that the water and the solvents comply with recycling regulations, and then packaged.

17. The method of claim 13, wherein the step of mixing the waste ink is performed in an agitation station.

18. The method of claim 13, wherein the slurry mixture is homogeneous.

19. The method of claim 13, wherein the step of grinding the slurry mixture is performed in a grinder.

20. The method of claim 19, wherein the grinder is a stirred ball mill grinder.

21. The method of claim 13, wherein after the step of grinding the slurry mixture to produce an ink emulsion, the further step of:

processing the ink emulsion to remove any entrapped air and to ensure a uniform texture and a uniform density of the ink emulsion.

22. The method of claim 21, wherein the step of processing the ink emulsion is performed by an ink mill.

23. The method of claim 13, wherein the waste ink and the virgin ink are lithographic ink.

24. The method of claim 13, wherein the ink emulsion is suitable for continuous tone lithography.

25. A method of reclaiming waste ink contaminated with water, solvents, and solid impurities, comprising the steps of:

mixing the waste ink to create a slurry mixture containing the waste ink, the water, the solvents, and the solid impurities;

evaporating a substantial portion of the water and the solvents from the slurry mixture under a vacuum; and grinding the slurry mixture under the vacuum to produce an ink emulsion such that the waste ink and the solid impurities are ground to a particle size that is less than or equal in size to a particle size of virgin ink from which the waste ink is derived, wherein the step of grinding the slurry mixture generates heat sufficient to evaporate any remaining water and solvents from the slurry mixture without evaporating the waste ink.

26. The method of claim 25, wherein the step of mixing the waste ink is performed in an agitation station.

27. The method of claim 25, wherein the slurry mixture is homogeneous.

28. The method of claim 25, wherein the step of evaporating a substantial portion of the water and the solvents from the slurry mixture is performed in an evaporator chamber.

29. The method of claim 25, wherein the substantial portion of the water and the solvents evaporated from the slurry mixture during the evaporating step, and the remaining water and solvents evaporated from the slurry mixture during the grinding step, are collected in a condensation tank.

30. The method of claim 29, wherein the water and the solvents collected in the condensation tank cool and separate according to their respective relative densities.

31. The method of claim 30, wherein after the water and the solvents in the condensation tank cool and separate according to their respective relative densities, the water and the solvents are removed from the condensation tank, tested to ensure that the water and the solvents comply with recycling regulations, and then packaged.

32. The method of claim 25, wherein the step of grinding the slurry mixture is performed in a grinder.

33. The method of claim 32, wherein the grinder is a stirred ball mill grinder.

34. The method of claim 25, wherein after the step of grinding the slurry mixture to produce an ink emulsion, the further step of:

processing the ink emulsion to remove any entrapped air and to ensure a uniform texture and a uniform density of the ink emulsion.

35. The method of claim 34, wherein the step of processing the ink emulsion is performed by an ink mill.

36. The method of claim 25, wherein the waste ink and the virgin ink are lithographic ink.

37. The method of claim 25, wherein the ink emulsion is suitable for continuous tone lithography.

* * * * *